C. R. LOTT.
METHOD AND APPARATUS FOR MAKING GLASS ARTICLES.
APPLICATION FILED SEPT. 27, 1909. RENEWED MAR. 27, 1920.
1,382,994.
Patented June 28, 1921.
8 SHEETS—SHEET 3.
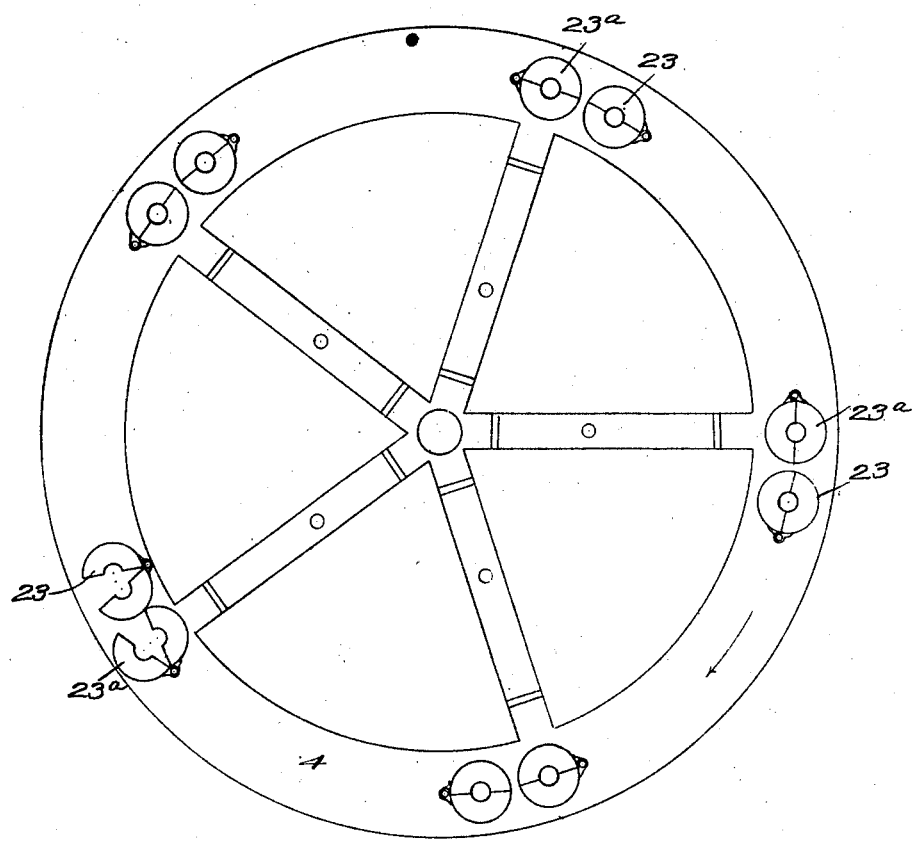
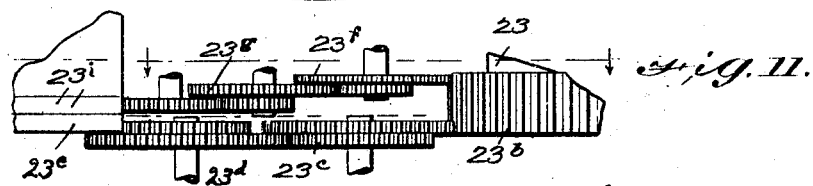
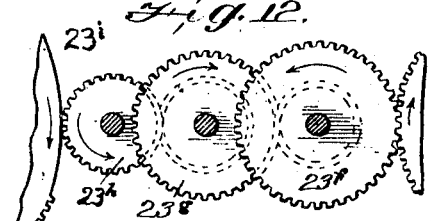
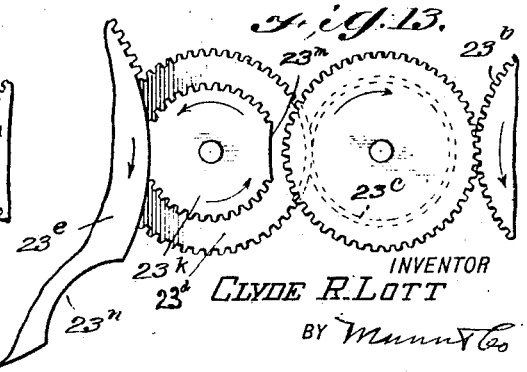
WITNESSES
INVENTOR
CLYDE R. LOTT
BY
ATTORNEYS

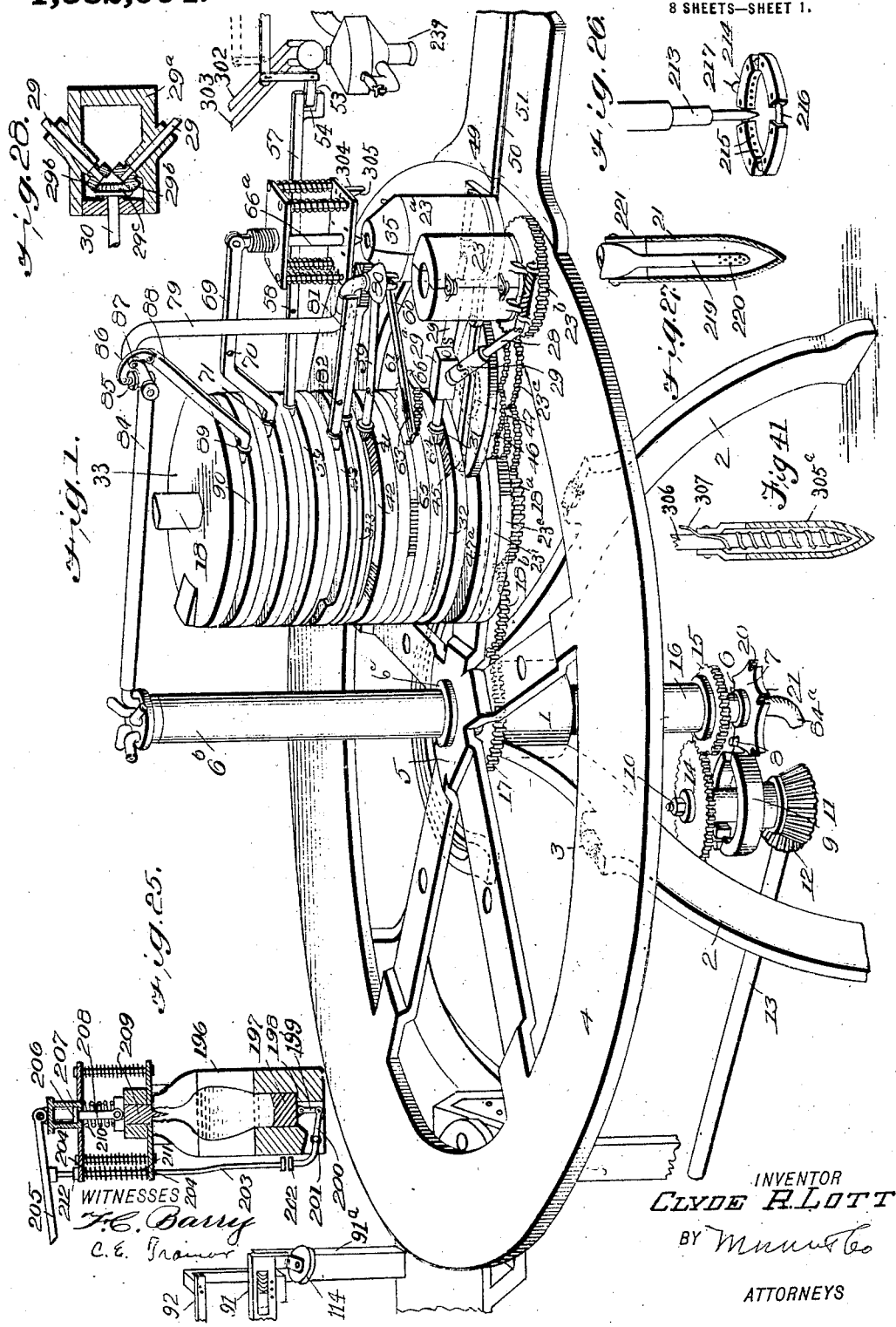

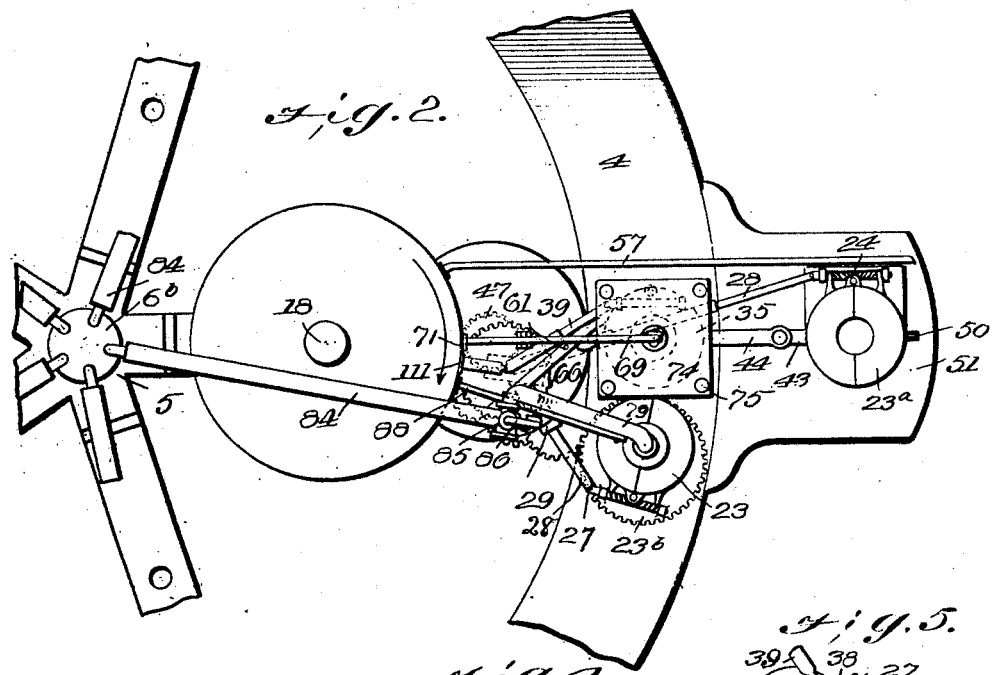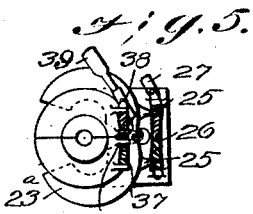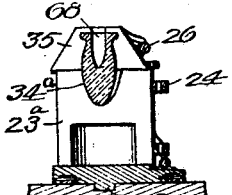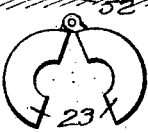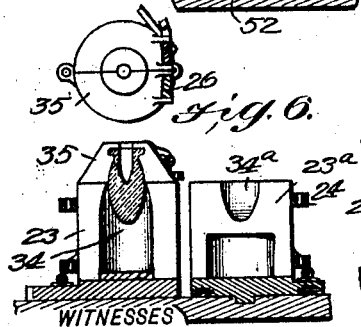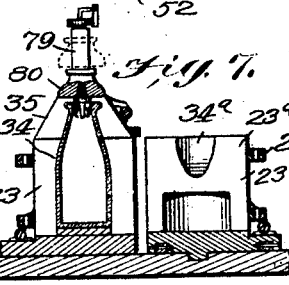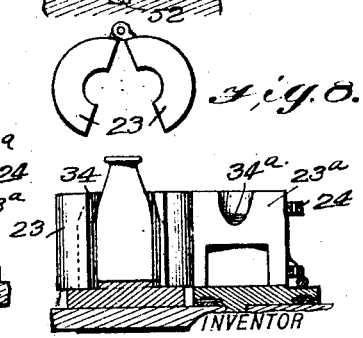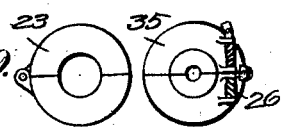

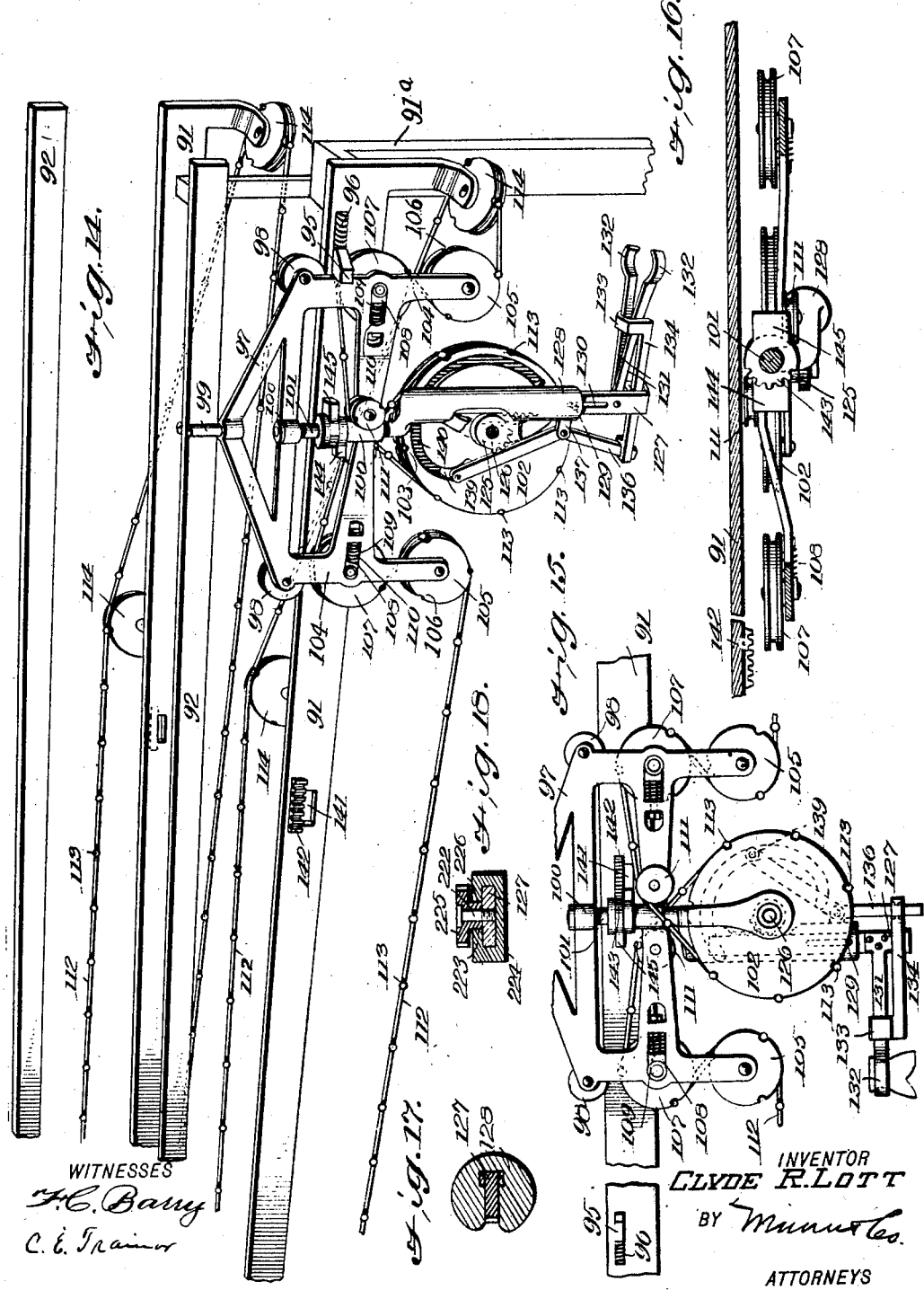

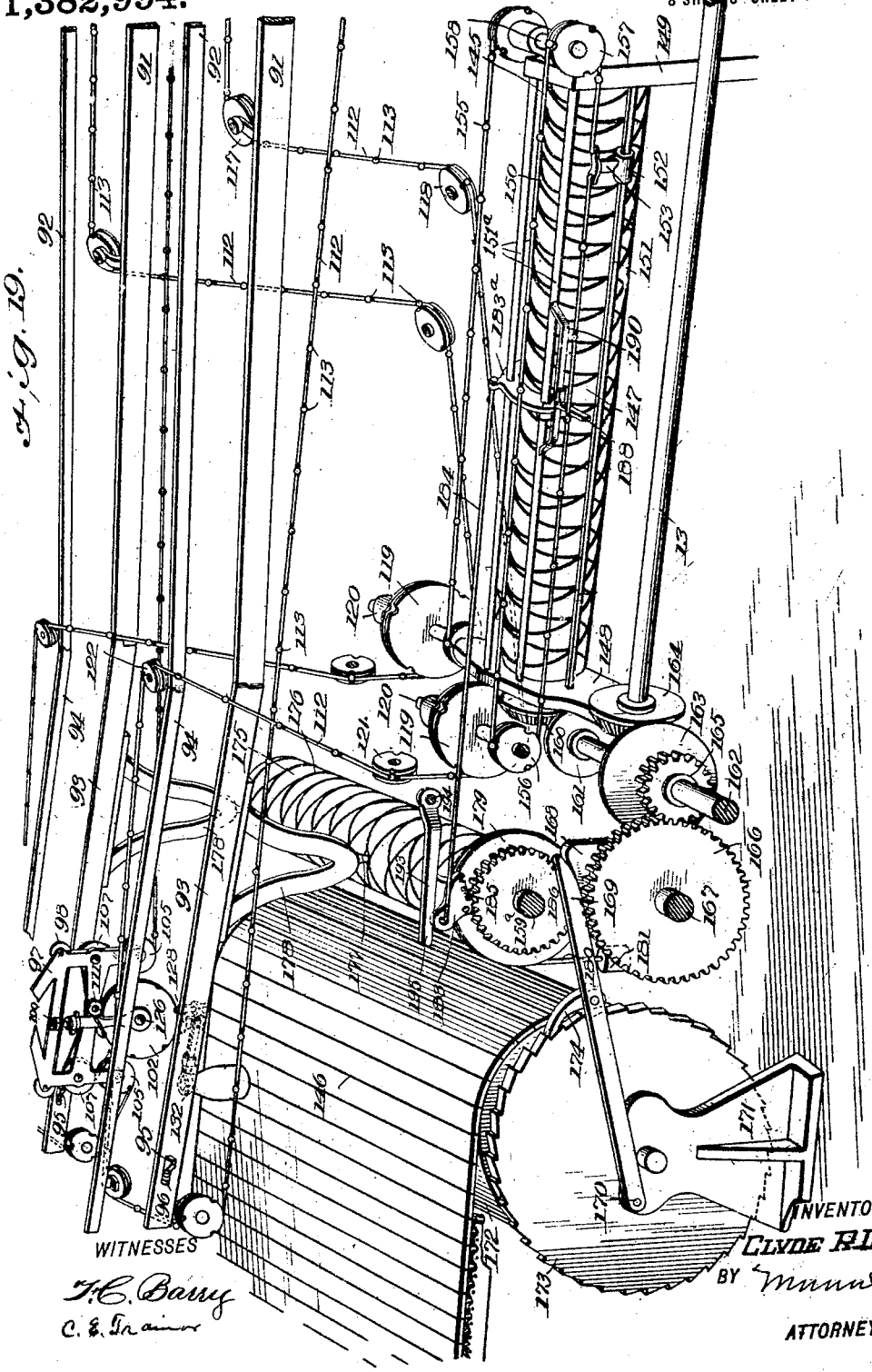

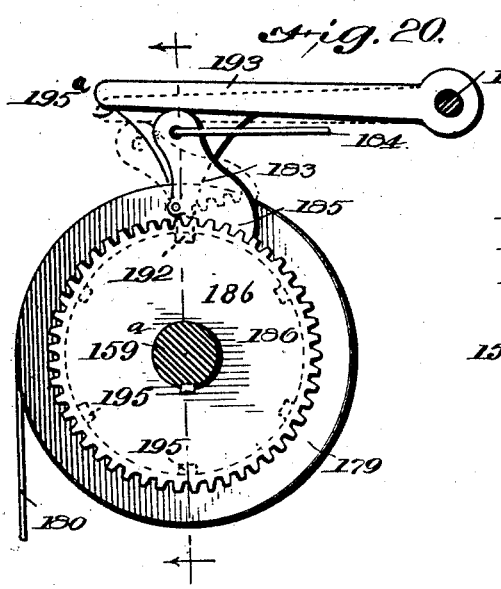
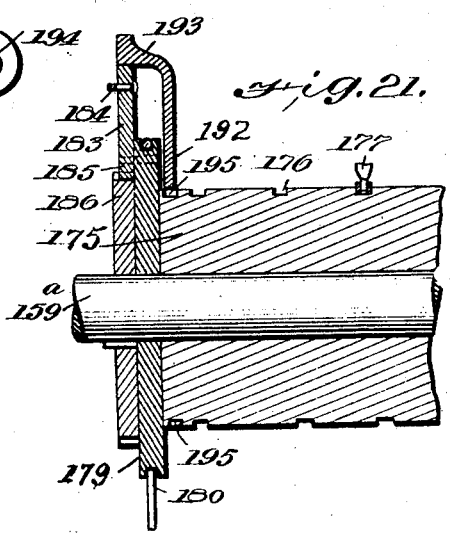
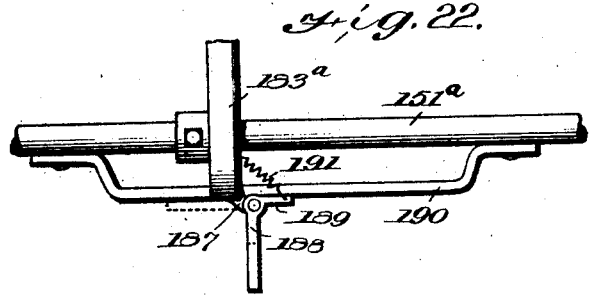
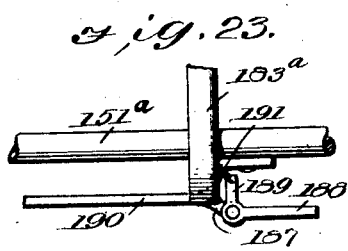
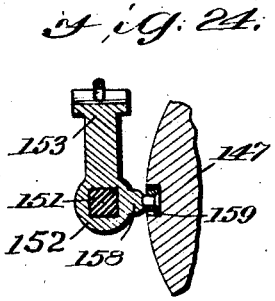

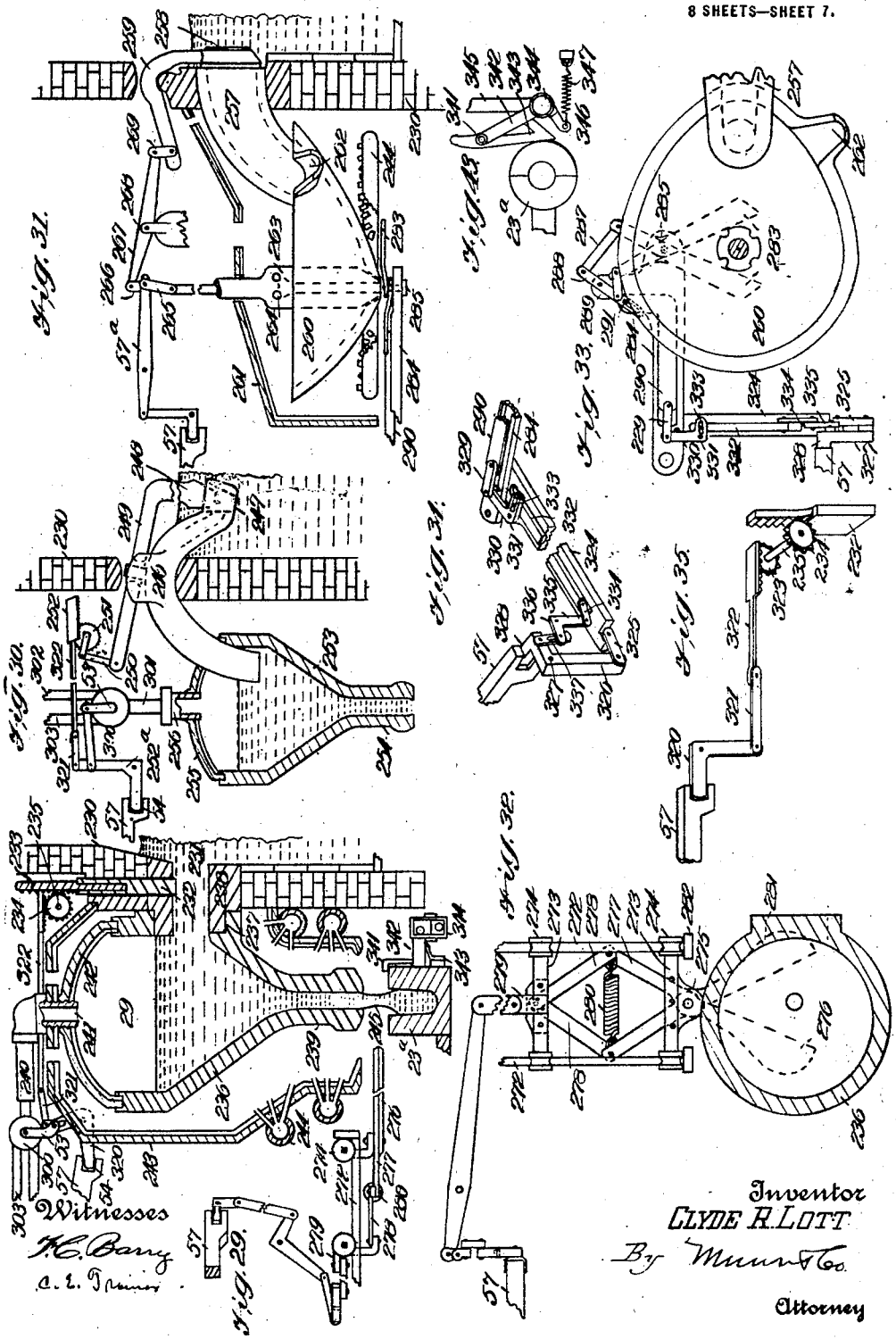

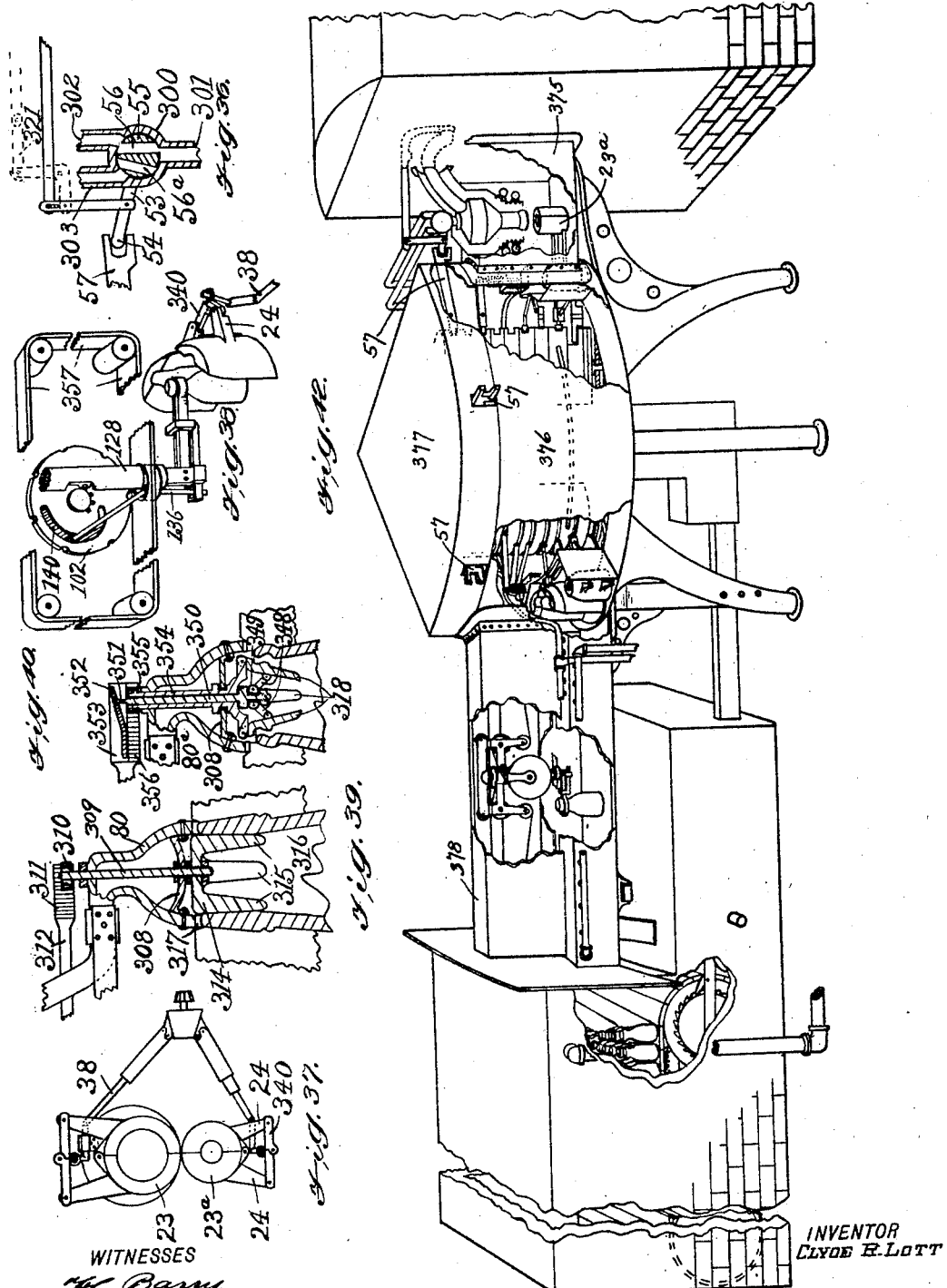

UNITED STATES PATENT OFFICE.

CLYDE R. LOTT, OF WASHINGTON, DISTRICT OF COLUMBIA, ASSIGNOR TO THE GUARDIAN TRUST AND SAVINGS BANK OF TOLEDO, TRUSTEE, OF TOLEDO, OHIO, A CORPORATION OF OHIO.

METHOD AND APPARATUS FOR MAKING GLASS ARTICLES.

1,382,994.     Specification of Letters Patent.     Patented June 28, 1921.

Application filed September 27, 1909, Serial No. 519,678. Renewed March 27, 1920. Serial No. 369,439.

*To all whom it may concern:*

Be it known that I, CLYDE R. LOTT, a citizen of the United States, and a resident of the city of Washington, District of Columbia, have made certain new and useful Inventions Appertaining to Methods and Apparatus for Making Glass Articles, of which the following is a specification.

This invention is a process of, and apparatus for, making and manipulating glass and other articles, but it is particularly adapted for making glass bottles, jars, etc.

The invention enables a certain quantity of molten glass to be drawn off automatically, from a furnace or other receptacle, automatically shaped, and delivered to, and through, an annealing apparatus, and in a practically continuous manner, thereby both expediting and economizing in the manufacture of the articles under consideration.

So far as shaping the glass is concerned, this operation may be performed in a press, or the glass may be subjected to a preliminary pressing operation, and the final shaping accomplished by "blowing".

The several operations of molding or shaping the glass, delivering the shaped articles to and through the annealing furnace, etc., are performed in chambers containing air, the temperature of which is to be predetermined, thereby producing more durable and perfect ware, thereby preventing chilling of the article, and avoiding the large percentage of loss, incident to performing one or more of the specified operations in the open air. In other words, I consider it of great importance to carry out the several operations while controlling the temperature, of the articles in an atmosphere of predetermined temperature, depending on the particular material operated upon, and the character of the articles to be made.

There are so many features of novelty embodied in the invention that an enumeration of them all, prior to giving a detailed description thereof, would appear to be unnecessary. I may state, however, that among the important features of the invention may be mentioned the automatic means for drawing the glass from the furnace, the mechanism for shaping the same, the carrying devices for delivering the shaped articles to the annealing furnace, and the novel features of construction embodied in the conveyer and said annealing furnace.

Other features herein disclosed are set forth and claimed in my Patents Nos. 1,338,992, May 4, 1920, and 1,369,679, Feb. 22, 1921, and in my co-pending applications as follows:

Ser. No. 244,684, filed July 13, 1918, making glass ware.

Ser. No. 259,419, filed Oct. 23, 1918, means for working molten glass.

Ser. No. 365,784, filed Mch. 15, 1920, means for shaping glass articles.

Ser. No. 349,922, filed Jan. 7, 1920, means for producing charges of molten glass.

Ser. No. 365,785, filed Mch. 15, 1920, method and apparatus for flowing molten glass.

Ser. No. 365,786, filed Mch. 15, 1920, temperature controlling and lubricating means for mold plungers.

In the accompanying drawings I have illustrated certain embodiments of the invention, but the same are to be understood as illustrative, only, and not as defining the limits of the invention.

Figure 1 is a perspective view of a shaping mechanism.

Fig. 2 is a plan view of a portion thereof.

Fig. 3 is a central longitudinal section through a mold showing the first operation on the glass.

Fig. 4 is a similar view showing the operation completed.

Fig. 5 is a plan view and a longitudinal section of the mold after the completion of the first operation.

Fig. 6 is a plan view of an auxiliary mold, and a longitudinal section of the two molds at the third operation.

Fig. 7 is a longitudinal section of the molds at the fourth operation.

Fig. 8 is a top plan view of one mold, and a longitudinal section of both molds at the 5th operation.

Fig. 9 is a plan view of the molds with the auxiliary mold in place over one of them.

Fig. 10 is a diagrammatic view of the table.

Fig. 11 is a detail side view of the connection between the operating cams and the finishing molds.

Fig. 12 is a top plan view of the upper train of gears connecting the cam with the finishing mold, Fig. 13 is a similar view of the lower train of gears.

Fig. 14 is a perspective view of one end of the carrier, and a carriage.

Fig. 15 is a side view of the carriage.

Fig. 16 is a horizontal section of one end of the conveyer showing a plan view of the carriage.

Fig. 17 is a transverse section of the bracket supporting the gripper.

Fig. 18 is a similar view of a modified form of bracket.

Fig. 19 is a perspective view showing the adjacent ends of the carrier and leer conveyer.

Fig. 20 is a side view of a portion of the mechanism for shifting the track.

Fig. 21 is a partial central longitudinal section of the shifting drum.

Fig. 22 is a detail plan view of a portion of the mechanism for operating the conveyer of the leer.

Fig. 23 is a similar view showing the mechanism in a different position.

Fig. 24 is a vertical section through a portion of the drum, and cam finger.

Fig. 25 is a central longitudinal section through a modified form of mold.

Fig. 26 is a perspective view of a plunger and mechanism for heating the same.

Fig. 27 is a sectional view showing a modified form of plunger.

Fig. 28 is a horizontal section through the casing 29ª showing the connection between the mold opening means and the cam.

Fig. 29 is a section through the cup or charger and adjacent parts, the surrounding casing (such as illustrated in Fig. 42) being removed for the purpose of more clearly showing the illustrated parts. The shearing mechanism is diagrammatically illustrated in this view.

Fig. 30 is a similar view of a modification including a siphon spout.

Fig. 31 is a similar view of a further modification in which is shown a spout especially adapted for large ware.

Fig. 32 is a plan view of one form of shears.

Fig. 33 is a similar view of another form.

Fig. 34 is a perspective view of a portion of Fig. 33.

Fig. 35 is a perspective view of the operating mechanism for a valve shown in Figs. 29 and 30 controlling the flow of glass from the furnace.

Fig. 36 is a sectional view of the valve for controlling the pressure in the containers shown in Figs. 29 and 30.

Fig. 37 is a plan view of a modified form of mold.

Fig. 38 is a detail view of a portion of the mechanism shown in Fig. 42, and a belt.

Fig. 39 is a sectional view of a cap and shaping device for shaping the neck of the bottle.

Fig. 40 is a similar view of a modified form of cap and shaper.

Fig. 41 is a section of a modified form of plunger.

Fig. 42 is a perspective view of the complete device, parts of the casing being broken away.

Fig. 43 is a top plan view of the blank mold and a burner for reheating the end of the stream of glass from which a charge has been severed.

The present embodiment of my invention comprises a shaping machine proper, a carrier for receiving the finished article from the machine, and removing it to the leer, where it is placed on a conveyer and moved gradually through the annealing device or leer. The shaping of the article takes place upon a circular table or wheel to which is imparted a step-wise rotation. The molten glass is received in one mold of a pair, a series of which are arranged in spaced relation on the table, in which it receives an impression from the plunger, and is then immediately transferred to the other mold in which the process of shaping is finished. A cam is arranged adjacent to each pair of molds for operating the various mechanisms connected with the shaping of the article, and each pair of molds with its operating mechanism forms a distinct entity, for which reason only one will be described.

A hub 1 is provided having legs 2, extending outwardly therefrom, and the legs are provided with friction rollers 3, upon which a circular table or wheel 4 is supported, the table being provided with a hub 5, secured to a shaft 6, whose lower end is provided with a star wheel 7, engaged by pins 8 on a disk 9 secured to a stud shaft 10 journaled adjacent to the star wheel, and provided on its lower end with a bevel gear 11, meshing with a bevel gear 12 on a shaft 13.

The upper end of the stud shaft 10 is provided with a gear wheel 14, which meshes with a gear wheel 15, secured to a sleeve 16, journaled in the hub 1 before mentioned, and the upper end of the sleeve is provided with a gear wheel 17, connected by trains of gears with the cam shafts 18, one of which is journaled on the table adjacent to each pair of molds.

The star wheel 7 is provided with 5 notches 20, and with a corresponding number of arc shaped recesses 21, so that for each half revolution of the disk 9, the table 4 will be turned a 5th of a revolution, and will be locked by the engagement of the arc shaped recesses with the convex periphery of the disk 9. The cam shafts 18 however, through their connection with the gear 14 rotate continuously.

The upper face of the table 4 as before stated, is provided at spaced intervals with 5 pairs of molds, each pair consisting of a mold 23, and a mold 23ª, and each of the molds consists of a pair of hinged sections as shown in Fig. 2. Neither of the molds 23 or 23ª is complete in itself, a single auxiliary or neck mold 35 being provided for completing both of the molds 23 and 23ª.

Each of the sections of each mold is provided adjacent to the hinge 24 with lugs 25 having threaded openings, and the lugs on the sections of one mold are engaged by a right and left handed screw 26, the arrangement being such that when the screw is rotated in one direction, the lugs will be moved toward each other, to open the mold sections, and when rotated in the opposite direction, the lugs will be moved from each other to close the sections. The screw threaded rod 26 is connected by a universal joint 27, with the inner section 28, of a telescoping arm whose outer section 29 is journaled in a casing 29ª and provided on its inner end with a bevel gear 29ᵇ, meshing with a bevel gear 29ᶜ, on a shaft 30, whose inner end is provided with a bevel gear wheel 31, engaging a mutilated gear wheel 32, forming a part of the cams 33 secured to the cam shaft.

The auxiliary mold 35 is also provided with lugs 36, having threaded openings, which engage the ends of a right and left handed screw 37, which is connected by a universal joint 38, with the outer end of a jointed shaft 39, whose inner end is provided with a bevel gear 41, meshing with a mutilated gear wheel 42, forming a part of the cam 33 before mentioned.

The charging mold 23ª is provided with a lug 43, pivoted to one end of an arm 44, whose other end is pivoted on a wrist pin 45, on a disk 46 mounted for rotation adjacent to the cam 33. The disk has connected therewith a mutilated pinion 47, which meshes with a mutilated gear wheel 47ª also forming a part of the cam 33.

It will be evident that when the disk is rotated, the arm will be extended to move the mold toward the molten glass container, the spout 239 which is shown in Fig. 1. The wheel or table is provided with radial grooves 49, (but one groove being shown) one of which is adapted to register at every stoppage of the wheel or table, with a groove 50, on a platform 51 leading to the glass furnace (not shown), and the mold 23ª is provided with a lug 52 which moves in the grooves, said grooves forming a guide way for the mold.

The cavity 34 of the finishing mold 23 is of the shape of the article to be produced, while the cavity 34ª of the mold 23ª is merely a depression in the top of the mold as shown in Fig. 6, and the auxiliary mold 35 is adapted to fit over the top and complete both of the molds as before stated, the cavity of the said auxiliary mold being shaped to form the upper part of the article to be molded.

The flow of molten glass is controlled by a valve, whose stem 53 is adapted to be engaged by a recess 54 in the end of a lever 57, (Fig. 1) pivoted as at 58 adjacent to the molds, the inner end of the lever engaging a cam groove 59 in the cam 33. There is a lever 57 associated with each pair of molds.

The valve comprises a plug 55, which has two substantially parallel passages 56 and 56ª and the casing 300 of the valve is provided with a pipe 301 connected through a pipe 240 (Fig. 29) to the container 236, or through a pipe 256 (Fig. 30) to the container 253. The casing 300 is also connected through pipes 302, 303 with a source of fluid under pressure, and with an exhausting device respectively. The above mentioned containers will be described in detail hereafter.

The cam groove 59 is provided with off-set portions at proper intervals, which swing the lever to open and close the valve at the proper time, when the mold 23ª is in position beneath the spout 239.

The auxiliary mold 35 (see Fig. 1) is mounted on an arm 60 pivoted near its center as at 61, the other end being slotted, and engaged by a wrist pin 63 on a mutilated pinion 64, journaled adjacent to the cam and adapted to be engaged by a mutilated gear wheel 65 forming a part of the cam 33 before mentioned. The mutilated pinion 64 has portions of the periphery thereof cut-away as at 66, leaving concave recesses which engage the mutilated portions of the gear wheel to lock the pinion from rotation, when the gear teeth of the pinion and the gear wheel are not in mesh. It will be evident that when the geared portion of the mutilated gear wheel 65 engages the geared portion of the pinion 64, the pinion will be rotated and the arm will be swung to move the auxiliary mold from one of the molds to the other, and when a recess is engaged with a mutilated portion of the gear wheel the pinion will be locked.

After a suitable amount of molten glass has been discharged from the container the charge is separated from the remainder of the glass by a suitable form of shears, to be presently described in detail.

After the mold 23ª has received its charge of glass and has been returned to the position shown in Fig. 1, with the auxiliary mold 35 thereabove, a plunger 66ª provided with a point 67, is moved into the auxiliary mold as shown in Fig. 3, to form a depression 68 as shown in Fig. 4, and the plunger is pivoted to an arm 69, which is pivoted as at 70, the inner end 71 of the arm engaging a cam groove forming a part of the cam 33.

A follower plate or shield 73, is arranged adjacent to the lower end of the plunger, the point 67 passing therethrough, and a second plate 74 is arranged above the first plate, the plates being connected by pins 75, slidable through the plates, and having springs 76 arranged between the plates and encircling the pins. Another spring 77 is arranged between a collar 78 on the plunger and the upper plate.

After the formation of the cavity, in the portion of the glass in the mold 23$^a$, both molds are opened and the auxiliary mold 35 is transferred with the blank to the mold 23. The mold 23 is dircetly beneath a blow head or cap 80 (Figs. 1 and 7) on the end of a tube 79, the cap being connected with the outer end of an arm 81, which is pivoted as at 82, and has its inner end engaged with a cam groove 83, forming a part of the cam 33, and the upper end of the tube is connected with the pipe 84 leading from the shaft 6 which is hollow, and is connected at its lower end by a suitable tube 84$^a$, with a suitable source of compressed air supply.

A valve 85 controls the communication between the tube 79, and the pipe 84, which valve is operated by a lever 86, pivoted as at 87, and engaged by an arm 88, provided with a roller 89, projecting into a cam groove, 90, on the cam 33.

When the valve 85 is opened a blast of air is forced into the mold 23, expanding the molten glass into contact with the inner wall of the mold, thus shaping the article to be formed as shown in Fig. 7.

The formation of the article is now complete, and at this point, the auxiliary mold 35 is opened and transferred to mold 23$^a$, the mold 23 is rotated about a quarter turn and opened, and the article is removed therefrom by a mechanism to be presently described.

It will be observed from an inspection of Figs. 1 and 11, that the mold 23 rests upon the face of a pinion 23$^b$ which is connected by two trains of gears, with mutilated gear wheel 23$^i$ and mutilated gear and cam 23$^e$ respectively, both forming a part of cam shaft 33. 23$^b$ and 23$^i$ are connected by gears 23$^f$, 23$^g$ and 23$^h$ operating at intervals to rotate 23$^b$ and mold to face outward. 23$^b$ and 23$^e$ are connected by gear wheels 23$^c$ and 23$^d$ carrying mutilated pinion 23$^k$ operated at intervals to rotate 23$^b$ and mold to their original position. 23$^k$ is provided with concaved recesses 23$^m$ which are adapted to engage the mutilated portions of the gear wheel 23$^e$ to prevent the rotation of the pinion 23$^b$ whereby to hold the mold in a fixed position. The gear wheel 23$^e$ is however provided with concaved recesses 23$^n$ which are so arranged as to unlock the pinion 23$^k$ at the time the pinion 23$^h$ is engaged by gear wheel 23$^i$.

The cam 33 is described as a cam for convenience, but consists of a series of superposed cams, all of which are secured to the same shaft and rotate in unison. The shaft 6 is hollow and the air pipe 84$^a$ extends upwardly therethrough, and through a casing 6$^b$, arranged thereabove, to the pipe 84. The shaft above the hub 1 is provided with a flange 6$^c$ which is connected with the hub 5 of the table, thus constraining the table to rotate with the shaft.

A plurality of tracks is provided leading from the table to the leer to be presently described, each of the tracks consisting of a pair of bars 91, 92, the bar 92 being arranged above the bar 91, and each of the bars 91 and 92 is provided with a hinged section 93, 94 adjacent to the leer, the hinged section swinging on a vertical axis. The track may be supported in any suitable manner, and at each end the lower bar 91 is provided with a buffer 95 against which bears a spring 96, the bar being slotted to receive the buffer and the spring, as shown in Figs. 14 and 19.

A carriage 97 is provided with grooved wheels 98, running on the upper edge of the lower bar, and with spaced pins 99 between which is received the upper bar.

The carriage is provided at approximately its center with alined bearings 100, in which is journaled the body portion 101, of a yoke, and between the arms of the yoke is journaled a grooved wheel 102, whose peripheral surface is provided at spaced intervals with notches 103, for a purpose to be presently described. On each side of the yoke, the carriage is provided with depending portions 104, on whose lower ends are journaled grooved pulleys 105 also provided on their peripheral surface with notches 106. Above the pulleys 105 are journaled other grooved and notched pulleys 107, the pulleys being journaled in bearings 108, movable in slots 109 in the carriage, and normally pressed outward by springs 110. Other pulleys 111, are journaled on the carriage, adjacent to the yoke, and each of the pulleys 107, 111 is provided with peripheral notches.

A cable 112 is provided at spaced intervals with buttons, balls or knots 113, and the cable passes under the pulleys 105, over the pulleys 107, and around the wheel 102, the cable extending between the leer and the shaping machine, and being supported by grooved and notched pulleys 114 arranged at suitable positions near the track.

Adjacent to the conveyer, a loop of the cable is carried outwardly, over pulleys 117, 118, 121 and 122, to a pulley 119 journaled on a stud shaft 120.

The tension of the springs 108 is sufficient to prevent movement of the pulleys 107, inwardly under the ordinary tension of the cable, but when the carriage meets a buffer 95, the tension on the cable exceeds the tension of the springs, and the pulleys move inwardly thus permitting the cable to move with respect to the carriage, which movement causes a rotation of the wheel 102.

A mutilated gear wheel 125 is secured to the shaft 126, of the wheel 102, and the said gear wheel is adapted to mesh with a rack bar 127, slidable in a sleeve 128 connected with the yoke body, and depending on one side of the wheel as shown in Fig. 14. The rack is limited in its movement by a pin 129 passing through a slot 130 in the rack bar, and to the lower end of the rack bar are secured the shanks 131 of a pair of gripping jaws or tongs 132, the shanks being of resilient material, normally holding the gripping jaws in spaced relation.

The jaws are moved toward each other by a sleeve 133, slidable on the shanks thereof, the sleeve being provided with an arm 134, having at its free end a bearing which receives one end of a lever 136, pivoted to a bracket 137 extending from the sleeve 128, and the other end of the lever is provided with a friction roller 139, engaging a cam groove 140 in the face of the wheel 102. The groove is so formed that when the wheel rotates, the sleeve 133 will be moved toward the gripping jaws to clasp them on the neck of the article, and as soon as they are firmly engaged with the neck of the article, the teeth of the mutilated gear will engage the rack, thus lifting the gripping jaws, and with them the article. At this movement the motion of the carriage is reversed by mechanism to be presently described, and commences to move toward the leer.

At a point slightly removed from the end of the carrier adjacent to the forming machine, the bar 91 of the track is provided with a slot 141, and above the slot with a short rack 142, and the body portion of the yoke between the bearings is provided with a mutilated gear wheel, 143 for engaging the rack, and with oppositely arranged lugs 144, 145.

When the mutilated gear engages the rack, the yoke is oscillated to swing the gripping jaws, and the article grasped therein, through an arc of 180°, the lug 144 extending into the slot 141, when the carrier is moved in one direction, while when moved in the opposite direction the operation is reversed.

During the remaining movement of the carrier the lugs 144, 145, prevent swinging movement of the yoke. The movement of the carrier is continued until it reaches the opposite end of the track and engages the buffer 95 at that end, when the sequence of movements just described is reversed, the article is released and placed on an endless conveyer 146 of any desired construction, it being understood that the reverse swinging of the gripping arms is accomplished at the shaping machine end of the track. The mechanism for reversing the movement of the carrier consists of a roller 147 journaled in suitable supports 148, 149 and provided on its peripheral surface with a double worm groove 150, and a plurality of rods 151 connect the supports 148, and 149 adjacent to the worm.

Upon one of the rods is slidably mounted a sleeve 152 provided with an upwardly projecting lug 153, to each end of which is connected the ends of a cable 145$^a$, the cable being provided at spaced intervals with balls 155, passing over a grooved and notched pulley 156, secured to the stud shaft 120 before mentioned, and over a grooved and notched pulley 157, journaled on a stud shaft 158 at the opposite end of the roller.

The sleeve 152 is provided with a finger 158$^a$ having journaled thereon, a friction roller 159, which engages the double worm groove in the roller, the engagement of the roller with the groove causing the bearing to move from end to end of the roller, and causing a consequent rotation of the shaft 120 in opposite directions, and the relation of the pulley 156 and the pulley 119 is such that a complete movement of the sleeve from one end of the roller to the other will cause a complete movement of the carriage from the shaping machine to the annealing device or vice versa.

The shaft of the roller 147 is provided at one end with a gear wheel 160, meshing with a bevel gear wheel 161 on the power shaft 162, which through a bevel gear 163, in mesh with a bevel gear 164 on the shaft 13 operates the shaping machine.

The shaft 162 is provided with a pinion 165 which meshes with a gear wheel 166 on a shaft 167.

A cam 168 is secured to the gear wheel, and is adapted to engage the free end of a lever 169 whose other end is pivoted as at 170 to a bracket 171, supporting one end of the roller 172 around which the conveyer 146 passes. A ratchet wheel 173 is secured to the roller adjacent to the bracket 171, and the teeth of the ratchet wheel are engaged by a pawl 174 pivoted to the lever 169. It will be evident that for every rotation of the gear wheel 166, the ratchet wheel will be moved and the relation between the parts is such that such movement takes place at the completion of a row of articles, transversely of the carrier, and the carrier is moved a sufficient distance to permit the placing of another row.

The mechanism for shifting the hinged section of the track consists of a drum 175, provided on its peripheral surface with a double worm groove 176, which is engaged by a cam finger 177 on a bracket 178, depending from and slidably connected to the lowermost bar of each track. The drum is provided at one end with a grooved pulley 179, upon which winds a cord 180, having on the free end thereof, a weight 181. The pulley 179 is loosely journaled on the shaft 159ª of the drum, and the weight normally retains it in the position shown in Fig. 19.

A pawl 183 is pivoted to the pulley, and a cord 184 is connected with the pawl on one side of the pivot, the other side being provided with gear teeth 185 for engaging a pinion 186, rigid with the drum.

The cord is connected with a carriage 183ª, slidable on the rods 151ª, and is provided with a lug 187 to which is pivoted a finger 188, having an angular portion 189, normally resting against the face of a bracket 190 secured to one of the rods upon which the carriage is movable. The angular portion is retained in contact with the face of the bracket by means of a spiral spring 191.

When the sleeve 152 moves toward the leer, it engages the finger and swings it over into the position shown in dotted lines in Fig. 22, but when it moves in the opposite direction, the finger is retained in the position shown in Fig. 22 in full lines by means of the engagement of the angular portion 189 with the face of the bracket. The carriage is thus constrained to move with the sleeve until the angular portion passes the end of the track as shown in Fig. 23, and is permitted to take the position shown in such figure, the sleeve now passes by the finger and releases the same. The movement of the carriage through the connecting cord 184 swings the pawl so that the gear teeth thereon engage with the pinion, and a further movement of the carriage rotates the drum, through a distance corresponding to the travel of the carriage.

The weight 181 partially rotates the pulley 179, which returns the carriage to its original position.

The drum is locked by means of a pin 192, on a lever 193 pivoted as at 194 which pin engages one of a series of openings 195 on the peripheral surface of the drum, and the said lever is provided with a flange or shoulder 195ª, which is engaged by the free end of the pawl, whereby to lift the lever when the pawl is moved by the carriage, to release the pin from the hole with which it is engaged.

In Fig. 25 is shown a modified form of mold, the mold proper 196 being provided with a movable bottom 197, which rests in its lowest position against a shoulder 198, formed in the opening of the mold in which the bottom is movable.

The bottom is connected by a link 199, with one end of a lever 200 which is pivoted to the mold, as at 201, and has its free end curved upwardly and headed as at 202. The headed end is adapted to be engaged by a headed end of a rod 203 slidable in bearings 204, on the follower plates, the upper end of the rod being adapted to be engaged by the arm 205, to which the plunger is indirectly connected, the arm 205 corresponding to the arm 69 in Fig. 1.

The arm 205 is pivoted to the top of a cylindrical casing 207, in which is slidable a piston 206, whose rod 208 is pivoted to the plunger 209. A spring 210 is arranged between the plunger and the bottom of the cylindrical casing and another spring 211 encircles the rod 203, having one end engaging a follower plate, and the other a collar 212 on the rod and normally tending to move said rod upwardly.

The above mold is especially adapted for long necked ware, the movable bottom moving upward when the plunger moves downward, whereby to insure that the molten mass will fill the neck of the mold. The piston and cylinder connection between the mold and the operating arm permits a considerable degree of movement of such arm before the plunger comes into operation.

In Fig. 26 the plunger is provided with a sleeve 213, of asbestos adjacent to the point thereof, and a series of arc-shaped hollow members 214, are arranged around the point, the members each being provided with a plurality of openings 215, and communicating with each other by means of short sections of pipe 216, and one of the members is provided with a gas supply pipe 217. The perforations 215 are in the inner faces of the members so that the point passes through a ring of heat, during each upward and downward movement.

In Fig. 27, the point 218 is hollow, and a small pipe 219 extends thereinto, the end of the pipe being provided with a plurality of perforations 220, for the escape of air to cool the point, which may be supplied to the pipe in any suitable manner, and the point is provided with slots 221, near its upper portion to permit the air to escape.

In Fig. 18 the bar 127 to which the shanks of the grippers are connected, is provided with a pin 222 extending through a slot 223 in the bracket 224, which in the present instance is rectangular in cross section, and a pinion 225 is journaled on the pin, the pinion having a hub 226 extending through the slot. It will be understood that the pinion 225 is designed to engage the mutilated pinion 125 journaled on the shaft 126.

It will be understood that the charge from the time it leaves the nozzle of the receptacle is never permitted to cool beyond a predetermined degree, the shaping means, the carrier, and the conveyer being all covered in and heated. A much superior article is thus obtained, the annealing process commencing at the shaping means, and being continued throughout the travel of the article.

An important feature of the invention is the dispensing with the use of a gatherer, and a punty, and the carriage of the molten glass from the furnace to the shaping device. The mold is extended to the container to receive the charge, and is then returned to the shaping device.

Another feature is the lock of the follower plate for holding the mold together, the said lock comprising the lugs 304, which have their inner edges beveled as at 305 to engage the bevel face of the auxiliary mold as shown in Fig. 1.

Another feature of the device is the heating of the plunger during the pressing operation, to keep the glass at a uniform temperature, and this heating may be done by the mechanisms shown in Figs. 26 and 27, or by the mechanism shown in Fig. 41 wherein the plunger is a shell 305$^a$, whose upper end is contracted upon a stem 306, which stem is encircled by a resistance coil 307. If desired a cooling fluid may be passed through the perforations 215 of the mechanism shown in Fig 26 and 220 of the mechanism shown in Fig. 27 to cool the plunger during pressing operation or when it is withdrawn from the glass.

Another feature of the invention is the transferring of the blank while the molds are open and facing each other, so that it is not necessary to lift the blank, thus permitting a minimum cooling of the charge, since it is moved but a short distance and exposed but a short time.

Another feature is the improved form of blowing cap shown in Fig. 39. In the said figure, the cap 80 is hollow, and is provided with a spider 308, in which and in the cap is journaled a shaft 309 provided on its upper end with a pinion 310 which is engaged by a rack 311 on an arm 312 longitudinally movable, the opposite end of the rod being engaged by a cam groove 313 on the cam 33 before mentioned.

At the lower end of the shaft is secured a shaper consisting of a body portion 314, and downwardly extending fingers 315, which are adapted to be inserted in the bottle neck 316, and the free edge of the cap is provided with a ring 317, preferably of asbestos, and whose face is shaped to fit the edge of the neck.

In Fig. 40 a former for certain kinds of ware is shown. The fingers 318 are pivoted at the upper end and connected by links 348 to a ring 349 around the lower end of a shaft 350 the upper end of which has a finger 351 that extends into a cam groove 352 in the face of the rack 353 to force said shaft down and upwardly, to force out and return the fingers 318 gently when they begin to rotate by the turning of sleeve shaft 354 keyed to pinion 355 which meshes with the teeth 356 in the rack which operates with a reciprocation motion from cam shaft 33.

Any desired form of outlet may be made use of in connection with the furnace, and in Figs. 29, 30 and 31, different forms are shown suitable for different wares.

In Fig. 29, the furnace 230 for the molten glass, is provided with an outlet 231, which is closed by a valve 232. The valve is provided with one or more upwardly projecting racks 233 which are engaged by pinions 234 on a shaft 235 journaled adjacent to the container, and operated by the cam 59 through the intermediary of the lever 57, by any suitable connecting mechanism, as for instance that shown in Fig. 35.

The said mechanism comprises an elbow lever 320 one of whose arms is adapted to be engaged by the recess in the end of the lever 57 and the other is connected by a link 321 with the outer end of the longitudinally movable rack bar 322 which engages a pinion 323 on the shaft 235.

A closed funnel shaped cup 236 is supported adjacent to the furnace, the said cup being provided with an opening 237 receiving a nipple 238 on the furnace which forms the outlet of the furnace, and the said cup is provided at its lower end with an outlet pipe 239 from which the molten glass may flow into the mold 23$^a$.

A pipe 240 connects the upper part of the cup with a suitable source of fluid under pressure, the said pipe being attached to a nipple 241 in a removable top 242 for the cup. The cup is inclosed by a casing 243, which may be heated by suitable pipes 244.

In the operation of the above construction, the valve 232 of the furnace is opened by the lever 57, and the molten glass is permitted to flow into the cup. Air under pressure is admitted to the cup after the valve is closed, and the molten glass is forced out through the pipe 239 into the mold. As soon as a charge is supplied to the mold, the air in the cup is partially exhausted, which thins the neck 245 between the charge in the mold and the glass in the cup, so that the shears may easily sever the said neck.

In Fig. 30 the charger 253 is provided with a siphon intake 246, whose tank opening 247 is normally closed by a plug 248 on one of the arms of an angle lever 249, whose other end is adapted to be engaged by a link 250 connected to a crank on a pinion 251 connected by a rack 252 and a link to the elbow lever 252$^a$ which is operated by the lever 57 before mentioned as in Fig. 29.

The outer end of the siphon delivers into a closed funnel shaped cup 253 having an outlet pipe 254 at its bottom and closed at its top by a removable cover 255, through which extends the adjacent end of an air pipe 256 connected with the pipe 301 leading to the three way valve 300. The operation of the above described construction is similar to that of the construction shown in Fig. 29.

In Fig. 31 is shown a construction especially adapted for the making of open ware. In this construction the charger 260 is provided with an intake pipe 257 whose one end is normally closed by a valve 258 connected with a lever 259, which is operated by the lever 57ª operated by lever 57 to open and close the valve.

A shallow funnel shaped container 260 is arranged below the outer end of the outlet, and the outlet and the container are inclosed by a casing 261. The container is provided with an overflow spout 262 and with an opening in its bottom.

The opening is closed by a valve 263 having air openings 264 therethrough, and a link 265 connects the upper end of the stem of the valve with the lever 57ª, which is operated by lever 57 shown in Fig. 1.

A second link 266 connects the lever 57ª with the end of another lever 267 pivoted as at 268, and the opposite end of the lever 267 is connected by a link 269 with the inner end of the elbow lever 259 to which is connected the valve 258.

In Fig. 32 are shown shears, consisting of spaced parallel rods 272, forming a track upon which is movable a carriage comprising transverse bars 273 having at each end a wheel 274 traveling on the rods. The front bar is provided with a lug 275 to which are pivoted the blades 276, and each of the blades is provided with a rearwardly extending shank 277 to the end of each of which is pivoted one end of a link 278, the rear ends of the links being pivoted together and to the operating bar 279 of the shears, which may be operated by one of the cams shown in Fig. 1. A spring 280 connects the rear ends of the shanks with each other, and the wheels 274 are adapted for engagement by the heads 282 of the rods 272. Each shank is arranged at an angle to its blade, and the blades are pivoted together in such manner that each shank is on the same side of a longitudinal line at the center of the carriage as its blade. The arrangement is such that when the free ends of the shanks are moved together, the free ends of the blades are also moved apart.

In the operation of this construction, the shears are moved bodily toward the mold, and when in position for severing the neck of the molten glass, the heads 282 of the rods engage the wheels 274, thus moving the bars 273 toward each other, and expanding the spring 280. The shanks 277 are moved apart, and this moves the blades 276 to shear the glass. On the return movement of the shears and their supporting carriage comprising the bars the spring contracts thus moving the blades apart.

In Fig. 33 a modified form of shears is shown comprising a pair of blades 283 pivoted together and to a bar 284 as at 285, and each of the blades is provided with a rearwardly extending shank, which shanks are connected by links 287 with the opposite ends of a lever 288 pivoted as at 289 to the bar 284. A second bar 290 is connected to operate the lever 288 by a wrist pin 291 sliding in a slot in the extended end of lever 288.

The above construction of shears is operated by an arm 324, whose one end is connected to the bar 284, and whose other end is connected by a link 325 with one of the arms of an elbow lever 326, which is pivoted as at 327, and whose other arm is provided with a lateral extension 328, which engages the recess in the end of the lever 57.

The free end of the bar 290, is connected by a link 329, with one of the arms of an elbow lever 330 pivoted as at 331 and whose other arm is slotted and connected to a longitudinally movable bar 332 by means of the pin 333 engaging the slot. The opposite end of the bar is connected by a link 334 with one of the arms of an elbow lever 335, pivoted as at 336 and whose other end is connected by the link 337 with that arm of the elbow lever 326 having the lateral lug 328, the connection between the link and the arm of the lever 326 being a lost motion connection as shown.

The above form of shears is especially adapted for use with the construction of outlet shown in Fig. 31. In operation the shears are moved toward the mold, and when in position for cutting, the bar 290 is moved longitudinally of the bar 284. This swings the lever 288 on its pivot, and the blades are moved together. A reverse movement of the bar moves the blades apart.

In the modified form of mold shown in Fig. 37, the lugs 24 are connected with the outer ends of a pair of toggle levers 340, whose adjacent ends are pivoted together and the inner member 38 of each telescoping arm has a finger or crank for operating the toggle levers. The construction of the mold otherwise is the same as in the forms shown in Figs. 3 to 9, and the operation is substantially the same.

Fig. 43 is a top plan view of the blank mold 23ª extended to the spout, and showing a jointed burner 341 which throws a blaze on to the glass in the end of the spout during the time mold 23ª is removed therefrom. When, however, the said mold is extended to receive a charge said mold strikes a finder 343 attached to burner arm 342 jointed at 344 and moves the burner 341 away from the mold while said mold is receiving its charge. As soon as the mold moves away from the spout, the burner is returned to its original position by a spring 347. The said spring is connected to a support at one end and is attached to the other by an arm 346 rigidly connected with the burner. Fuel is supplied to the burner by a pipe 345.

The machine is entirely automatic, taking the glass from the glass furnace and delivering it finished and ready for use, every part used necessarily being a part of the said machine to work in perfect unison.

For pressed ware it will be evident that the blowing mold can be dispensed with. As many kinds of glass have to be operated upon, Fig. 31 shows a spout and container preferred for large ware and glass of heavy or tough consistency.

It will be understood that the charge from the time it leaves the furnace is never permitted to cool beyond setting or solidifying until the annealing process commences and that is controlled, and carried on gradually the charger, shaping means, carrier, and the conveyer being all covered in and heated. A much superior article is thus obtained, the annealing process commencing at or near the shaping means and being continued throughout the travel of the article.

I claim:

1. The combination of a rotating table, molds arranged in a series of pairs upon said table, said molds being separable, and the pairs consisting of one charging mold and one finishing mold, a filling spout arranged laterally to the table, means for moving the charging mold to and from the spout, means carried by the table for controlling the discharge of glass from the spout, means on the table for transferring the glass charge from the charging to the finishing mold, means for blowing the charge in the finishing mold, and an off-taking means substantially as set forth.

2. The combination of a rotatable table, molds arranged in a series of pairs upon said table, said molds being separable, and the pairs consisting of one charging mold and one finishing mold, a filling spout arranged laterally to the table, means for moving the charging mold to and from the spout, means carried by the table for controlling the discharge of glass from the spout, means on the table for transferring the glass charge from the charging mold to the finishing mold, a device for producing a cavity in the glass charge, for the initial action of the blowing means, means for blowing the charge in the finishing mold, and an off-taking means substantially as set forth.

3. The combination of a revolving table, means thereon for carrying a mold, a spout arranged laterally to the table, guide devices below the spout, guide devices on the table coöperating with the first named guide devices, a mold movable to and from the spout along said guide devices, and means carried by the table for moving said mold to and from the spout, substantially as described.

4. In a device of the class described, a rotatable table, pairs of molds arranged at spaced intervals near the periphery of the table, each mold comprising a plurality of hinged sections, means for opening and closing the molds in unison at predetermined intervals, said means comprising a lug on each section of each mold provided with a screw threaded opening, a rod having right and left handed screw threaded portions engaging the lugs of a mold, a mutilated gear wheel adjacent to the molds, a shaft having a pinion for engaging the mutilated gear wheel, and a telescoping connection between the shaft and the rod.

5. In a machine of the class described, a receptacle provided with a spout, a rotatable table adjacent thereto, said table having pairs of molds arranged at spaced intervals near the periphery thereof, the table being provided with radial grooves adjacent to the molds, one of said molds having a lug movable in the groove, a platform leading from the table to the receptacle, and having a groove with which the radial grooves are adapted to register in succession, and means for moving the mold toward and from the receptacle.

6. In a machine of the class described, a sectional mold, a blowing device comprising a cap whose edge is shaped to fit the upper edge of the article to be formed, a reamer comprising fingers adapted to enter the neck and shape the same, a shaft to which the fingers are secured journaled in the cap, and means for partially withdrawing the reamer previous to the opening of the mold, and for completely withdrawing the same after the mold is opened.

7. In a machine of the class described, in combination, a container for receiving the molten glass, said container provided with an outlet, a valve for controlling the discharge of glass from said container, a stem for said valve, a lever engaging said stem, a mold, means for bringing said mold into operative relation to the discharge opening, and means carried with the mold for operating said lever to raise the valve when said mold is brought into such position.

8. In a machine of the class described, in combination, a charging mold, a blowing mold, and a supplementary mold adapted to fit on either the charging or the blowing mold, a rotating table on which said molds are carried, a container, a spout for said container, a valve controlling the discharge from said spout, a lever for controlling the position of the valve, and a cam for controlling the operation of the lever when the charging mold is in position to receive a charge from the spout.

9. In a machine of the class described, in combination, a charging mold, a blowing mold, and a supplementary mold adapted to fit either the charging or the blowing mold, means for automatically closing said charging mold and putting it in position to receive a charge of glass, means for putting the supplementary mold on said charging mold, means for thrusting a plunger through said supplementary mold into the charging mold, means for opening said charging mold and at the same time opening the blowing mold, the openings of the two molds being opposite each other, means for withdrawing the supplementary mold with its charge from the charging mold and introducing it into the blowing mold, and means for blowing an object.

10. In a machine of the class described, in combination, a carrier, a charging mold mounted on said carrier, a receptacle for holding molten glass, a spout for said receptacle, a valve for controlling the charge for said spout, ways upon which said charging mold may be thrust radially on the rotating table toward position under said spout, a lever carried by the table for controlling the opening of the valve, a cam for controlling the position of the lever, and a cam for controlling the thrusting of the charging mold radially, and said cams being mounted on the same shaft.

11. In a machine of the class described, in combination, a rotating carrier, a charging mold thereon adapted for radial movement with respect thereto, a glass container, means for thrusting the charging mold outward to receive a charge of glass and withdrawing it, a blowing mold arranged on the rotating table at the same radial distance as the charging mold in its withdrawn position, and a supplementary mold adapted to fit either the charging or the blowing mold and to be moved from the charging to the blowing mold.

12. In a machine of the class described, in combination, a rotating carrier, a charging mold thereon adapted for radial movement with respect thereto, a glass container, means for thrusting the charging mold outward to receive a charge of glass and withdrawing it, a blowing mold arranged on the rotating table at the same radial distance as the charging mold in its withdrawn position, and a supplementary mold adapted to fit either the charging or the blowing mold and to be moved from the charging to the blowing mold, and said charging and blowing molds being hinged and arranged so that they open toward each other whereby a parison may be moved directly from the charging mold into the blowing mold.

13. In a machine of the class described, in combination, a rotating carrier, a series of sets of molds on said carrier, a vertical shaft for each set of molds and a set of driven cams on said shaft, devices engaging with said cams and with said molds to open and close them, a container, a spout for said container, and means actuated by said shaft and connected thereunder, whereby one of said molds may be positioned under said spout and other means actuated from said shaft and controlling the discharge from said spout in timed relation to said positioning.

14. In a machine of the class described, in combination, a rotating table, a mold thereon, means for opening and closing the mold, means for thrusting the mold radially outward and withdrawing it, a container, a spout therefor, a shaft on said table, and means on said shaft whereby the mold may be thrust outward into receptive relation to said spout, a valve for controlling discharge from said spout, a lever connected to said valve and engaging said shaft, a set of shears for cutting the stream of glass discharged from said spout, means for thrusting said shears forward and back and for actuating them, and a connection between said lever and said shears, whereby after discharge is permitted the shears are actuated to cut off the charge.

15. In a device of the class described, in combination, a rotating table, a series of molds thereon, a vertical shaft mounted on said table, cams on said shaft, a container for hot glass, a spout for said container, means for thrusting into receptive position as to said spout, one of said molds, a valve for controlling the discharge of glass from said spout, a lever pivoted on the table and connected to said valve, a cam on said shaft for actuating said lever, a set of shears, ways for actuating said shears into and out of operative position, and connecting means between said shears and said lever whereby after discharge from said spout said shears are projected forward and actuated to sever the charge in the mold from the stream of glass.

16. The combination with a glass furnace having a flowing orifice, of means for severing the glass issuing from such orifice into charges, and a glass forming machine comprising a rotary mold carriage, finishing mold and a reciprocating member mounted to rotate with the carriage, said member adapted to receive the glass when severed and to transfer it to a position adjacent to the finishing mold, and means to transfer the glass into the finishing mold.

17. The combination with a glass furnace having a flowing orifice, of means for severing the glass issuing from such orifice into charges, a blank mold having a receiving position beneath said orifice to receive a charge, a rotary mold table, a finishing mold thereon, said blank mold being rotatable with the mold table and radially reciprocable to transfer the charges to a point adjacent to the finishing mold, and means to transfer the charge from the blank mold to the finishing mold.

18. The combination a mold table, a blank mold and a separate finishing mold located thereon side by side with their upper ends in the same horizontal plane, a neck mold, and automatic means to swing it laterally and without vertical movement into positions to register alternatively with the blank mold and the finishing mold while the blank and finishing molds remain in said relative position.

19. The combination of a mold table, a blank mold and a finishing mold located thereon side by side with their upper ends in the same horizontal plane, a neck mold, and automatic means to swing it laterally into position to register alternatively with the blank mold and the finishing mold, said blank mold and finishing mold each comprising a pair of sections hinged to swing horizontally for opening the mold and arranged with their open sides facing each other to permit a blank to be carried with the neck mold section directly from the blank mold into the finishing mold.

20. The combination of a mold table, means to rotate it, a mold thereon comprising sections hinged to swing about a vertical axis for opening and closing the mold, and automatic means to periodically rotate the mold on the mold table bodily about a vertical axis in one direction through a predetermined angle, open the mold and hold it open for a predetermined length of time, and then close it and rotate it in the reverse direction about said axis.

21. In a glass forming machine, the combination of a mold table, means to rotate it, a mold thereon beyond the axis of the mold table and comprising sections pivoted to swing about a vertical axis for opening and closing the mold, and means operated by the rotation of the mold table to rotate the mold bodily about its own axis and simultaneously swing the mold sections to open position.

22. In a glass forming machine, the combination of a mold table, means to rotate it, a mold thereon comprising sections pivoted to swing about a vertical axis for opening and closing the mold, and means operated by the rotation of the mold table to rotate the mold bodily about its own axis and simultaneously swing the mold sections to open position, said mold being so arranged that when open it faces outward, the rotation of the mold about its axis being through substantially one quarter turn.

23. The combination with a mold table and means for rotating it about a vertical axis, of a blank mold and a finishing mold placed side by side upon the mold table and each comprising sections hinged to swing about a vertical axis for opening the mold, said molds arranged to face each other when open to permit the transfer of the blank from one mold directly into the other, and automatic means to open the finishing mold and rotate it into position to face outward.

24. In a glass forming machine, the combination of a mold carriage, means to intermittently rotate it, a mold thereon, and automatic means operative while the mold carriage is stationary to periodically project the mold radially outward to receive a charge of glass and then return it.

25. In a glass forming machine, the combination of a mold carriage, means to intermittently rotate it, a mold thereon, and automatic means operative while the mold carriage is stationary for moving said mold radially outward to a charging position and returning it once during each complete rotation of the mold carriage.

26. The combination of a rotary mold table, a mold thereon, means for projecting the mold beyond the mold table, and automatic means for introducing a charge of molten glass into the mold when in said projected position.

27. The combination of a rotary mold table, a stationary platform, a mold on said table periodically brought opposite said platform by the rotation of the mold table, and automatic means to move the mold onto said platform to receive a charge of glass and to return it to the mold table.

28. The combination of a rotary mold table, a stationary platform, guides on the table and platform brought into register periodically by the rotation of the table, a mold mounted on the table to rotate therewith, and means to move the mold along said guides onto the platform when said guides are in register.

29. The combination of a mold table, an annular series of molds thereon, means to rotate the mold table step by step and thereby bring the molds serially to a charging station, and means to project each mold radially outward to a charging position when at said station.

30. The combination of a mold table, means to rotate the mold table intermittently, molds on said table, mechanism for opening and closing the molds, a plunger, mechanism for operating it, a neck mold, mechanism for operating it, a blowing head, valve mechanism therefor, and a cam device comprising a series of cams rotatable continuously about a vertical axis eccentric to the axis of the mold table, said cams arranged to operate and control said mechanisms.

31. The combination of a blank mold, a finishing mold, an auxiliary mold shaped to hold a blank and coöperating with said blank mold and finishing mold, and means to transfer the blank from the blank mold to the finishing mold by a movement of the auxiliary mold in substantially a straight line.

32. A blank mold and a finishing mold arranged side by side, means to open and close said molds, a neck mold, and means to move the neck mold horizontally and carry a blank horizontally from the blank mold into the finishing mold without relative vertical movement of the molds.

33. The combination of a rotating carriage, molds arranged in pairs thereon, each pair comprising a blank mold and a finishing mold, a charging device located laterally of the carriage, means to move each blank mold toward and from the charging device, means carried with the carriage to control said charging device and cause it to charge the blank mold, and means on the carriage for transferring the charge from the blank mold to the finishing mold.

34. The combination of a rotating table, a pair of spaced separate molds thereon, an auxiliary mold carried to rotate with the table, means to move one of the molds of said pair relative to the other into and out of a mold charging position, means to open the pair of molds, and automatic means to transfer the auxiliary mold with its charge from the first mold to the second mold while the molds are open.

35. The combination of a blank mold and a finishing mold located side by side and each comprising sections hinged to swing horizontally to open the mold, said molds arranged so that each mold is opened at the side facing the other mold, whereby the blank may be transferred horizontally from the blank mold directly into the finishing mold, and means for rotating the finishing mold bodily about a vertical axis.

36. The combination of a blank mold and a finishing mold located side by side and each comprising sections hinged to swing horizontally to open the mold, said molds arranged so that each mold is opened at the side facing the other mold, and automatic means to transfer a blank by a horizontal movement from the blank mold into the finishing mold.

37. The combination with a mold table, of a blank mold and a finishing mold located side by side on said table, said molds each formed in sections hinged to swing horizontally and arranged so that the open sides of the molds when opened are opposite each other, means for transferring a blank horizontally from the open blank mold into the finishing mold, and means for bodily rotating the finishing mold about a vertical axis into position to open outwardly for discharging the finished article.

38. The combination of a blank mold and a finishing mold located side by side and each comprising sections hinged to swing horizontally to open the mold, said molds arranged so that each mold is opened at the side facing the other mold, and an auxiliary mold section coöperating with said molds and shiftable from one to the other of said molds.

39. The combination of a blank mold and a finishing mold located side by side and each comprising sections hinged to swing horizontally to open the mold, said molds arranged so that each mold is opened at the side facing the other mold, an auxiliary mold section completing the blank mold and shaped to support a blank, and means to swing the auxiliary mold section and blank from the blank mold to the finishing mold.

40. In a glass forming machine, the combination of a mold table, means to move it, a mold thereon comprising sections pivoted to swing about a vertical axis for opening and closing the mold, and means operated by the movement of the mold table to rotate the mold bodily about a vertical axis and simultaneously swing the mold sections to open position.

41. The method which consists in causing molten glass to issue from an outlet orifice and move downwardly under the influence of gravity, periodically causing a restriction of the diameter of the glass adjacent the orifice by periodically exerting a retarding influence on the issuing glass, and severing the glass at said restriction.

42. The method which consists in causing a gravity flow of molten glass from an outlet orifice, periodically exerting an opposing force on the issuing glass and thereby causing a restriction or necking in of the glass adjacent the orifice, and then severing the glass at said restriction.

43. The method which consists in causing a column of plastic glass to issue from an outlet in a container for the glass, periodically restricting the diameter of the issuing column of glass by the application of a force other than the weight of the issuing glass, and periodically severing the glass at the point of restriction.

44. The combination of a receptacle to contain molten glass, said receptacle having an opening in the bottom thereof through which a stream or column of glass issues, means to periodically restrict the diameter of the issuing glass adjacent the outlet, and means to then sever the glass at the point of restriction.

45. The combination of a container for molten glass having an outlet orifice through which the glass issues under the influence of gravity, means auxiliary to the weight of the issuing column of glass, exerting an influence on the glass by which there is positively formed a necking in of the glass at a point adjacent to the outlet orifice, and means to sever the glass at the necked in portion.

46. The method which consists in causing molten glass to issue from an outlet orifice, regulating the rate of discharge of glass from the outlet to form a necking-in of the glass below and adjacent to the outlet, and severing the glass at the necked-in portion.

47. The method which consists in causing molten glass to issue from an outlet orifice, periodically exerting an accelerating influence on the issuing glass, necking-in, and then severing the glass at the necking-in portion.

48. The method which consists in causing molten glass to issue from an outlet orifice, periodically exerting a retarding influence on the issuing glass, and positively severing the issuing glass adjacent the orifice by a mechanical shear while under said retarding influence.

49. The combination of a receptacle to contain molten glass, said receptacle having an opening through which a stream or column of glass issues, means to periodically restrict the diameter of the issuing glass adjacent the outlet, a mechanical shear, and means to operate the shear to sever the glass at the point of restriction.

50. The method which consists in causing molten glass to issue from an outlet orifice, regulating the rate of discharge of glass from the outlet to form a necking-in of the glass below and adjacent the outlet, and positively severing the glass at the necking-in portion by a mechanical shear.

51. The combination of a receptacle containing molten glass having an outlet orifice through which the glass issues, means for controlling the amount of glass issuing through said orifice and for periodically restricting the diameter of the issuing glass adjacent the orifice, a mechanical shear normally out of contact with the glass issuing through said orifice, and means for operating said shear to periodically sever the glass at said restricted diameter.

52. The combination of a receptacle to contain molten glass, having an outlet orifice through which the glass issues, means for periodically exerting force upon the molten glass as it issues from the said orifice and for necking-in the glass issuing from said orifice, a mechanical shear normally out of contact with the issuing glass, and means for operating said shear to periodically sever the glass at said restricted diameter.

CLYDE R. LOTT.

Witnesses:
C. E. TRAINOR,
SOLON C. KEMON.